(12) United States Patent
Behoun et al.

(10) Patent No.: US 10,710,036 B2
(45) Date of Patent: Jul. 14, 2020

(54) INSTALLATION AND METHOD FOR TREATING A PLASTIC MELT

(71) Applicant: Next Generation Recyclingmaschinen GmbH, Feldkirchen an der Donau (AT)

(72) Inventors: Helmut Behoun, St. Valentin (AT); Klaus Brzezowsky, Marchtrenk (AT); David Hehenberger, Haslach an der Muehl (AT); Bernhard Pichler, St. Peter am Wimberg (AT); Thomas Pichler, St. Peter am Wimberg (AT)

(73) Assignee: Next Generation Recyclingmaschinen GmbH, Feldkirchen an der Donau (AT)

(*) Notice: Subject to any disclaimer, the term of this patent is extended or adjusted under 35 U.S.C. 154(b) by 480 days.

(21) Appl. No.: 15/560,798

(22) PCT Filed: Mar. 23, 2016

(86) PCT No.: PCT/AT2016/050074
§ 371 (c)(1),
(2) Date: Sep. 22, 2017

(87) PCT Pub. No.: WO2016/149725
PCT Pub. Date: Sep. 29, 2016

(65) Prior Publication Data
US 2018/0111101 A1     Apr. 26, 2018

(30) Foreign Application Priority Data

Mar. 23, 2015 (AT) ............... A 50232/2015
Mar. 23, 2015 (AT) ............... A 50233/2015

(51) Int. Cl.
*B01F 15/00* (2006.01)
*B29B 7/74* (2006.01)
(Continued)

(52) U.S. Cl.
CPC ........ *B01F 15/00194* (2013.01); *B01F 7/086* (2013.01); *B01F 7/10* (2013.01);
(Continued)

(58) Field of Classification Search
CPC .. B29B 9/16; B29B 7/401; B29B 7/42; B29B 7/726; B29B 7/7466; B29B 7/845;
(Continued)

(56) References Cited

U.S. PATENT DOCUMENTS 3,410,938 A   11/1968  Schippers
4,072,455 A   2/1978   Beck
(Continued)

FOREIGN PATENT DOCUMENTS

DE   2 243 024 A1   3/1973
DE   2 450 030 A1   5/1976
(Continued)

OTHER PUBLICATIONS

International Search Report of PCT/AT2016/050074, dated Jul. 14, 2016.

*Primary Examiner* — Anshu Bhatia
(74) *Attorney, Agent, or Firm* — Collard & Roe, P.C.

(57) ABSTRACT

An installation and a method for treating a plastic melt includes a reactor that has a reactor housing consisting of first and second reactor housing parts, a mixing element being arranged in the second reactor housing part and mounted thereupon so as to rotate about a rotational axis. The reactor, together with a discharge device and with at least one weighing device connected between these, is supported on a contact area.

51 Claims, 4 Drawing Sheets

(51) Int. Cl.
  *B29B 7/42* (2006.01)
  *B29B 7/40* (2006.01)
  *C08G 69/04* (2006.01)
  *B29B 7/72* (2006.01)
  *C08G 63/78* (2006.01)
  *C08G 64/02* (2006.01)
  *B01F 7/08* (2006.01)
  *B01F 7/10* (2006.01)
  *B01F 15/02* (2006.01)
  *B29B 7/86* (2006.01)
  *B29B 7/84* (2006.01)

(52) U.S. Cl.
  CPC .... *B01F 15/00246* (2013.01); *B01F 15/0227* (2013.01); *B29B 7/401* (2013.01); *B29B 7/42* (2013.01); *B29B 7/726* (2013.01); *B29B 7/7466* (2013.01); *C08G 63/785* (2013.01); *C08G 64/025* (2013.01); *C08G 69/04* (2013.01); *B01F 2215/0049* (2013.01); *B29B 7/845* (2013.01); *B29B 7/86* (2013.01)

(58) Field of Classification Search
  CPC ...... B29B 7/86; B01F 7/086; B01F 15/00194; B01F 7/10; B01F 15/00246; B01F 15/0227; B01F 2215/0049; C08G 63/785; C08G 64/025; C08G 69/04
  See application file for complete search history.

(56) References Cited

U.S. PATENT DOCUMENTS

| | | | |
|---|---|---|---|
| 5,108,711 | A | 4/1992 | Chszaniecki |
| 6,103,152 | A | 8/2000 | Gehlsen et al. |
| 7,198,846 | B2 | 4/2007 | Fujimoto et al. |
| 7,807,728 | B2 | 10/2010 | Yokoyama et al. |
| 8,758,887 | B2 | 6/2014 | Yen et al. |
| 9,944,008 | B2 | 4/2018 | Koenig et al. |
| 2015/0266209 | A1* | 9/2015 | Pichler ............... B29B 7/421 264/40.1 |

FOREIGN PATENT DOCUMENTS

| | | |
|---|---|---|
| EP | 1 302 501 A2 | 4/2003 |
| EP | 1 491 569 A1 | 12/2004 |
| EP | 1 833 597 B1 | 3/2011 |
| JP | S48-66188 A | 9/1973 |
| JP | 2002-254432 A | 9/2002 |
| JP | 2011-131381 A | 7/2011 |
| RU | 1837954 C | 8/1993 |
| RU | 2 513 427 C9 | 9/2014 |
| WO | 2007/131728 A1 | 11/2007 |
| WO | 2012/119165 A1 | 9/2012 |
| WO | 2014/040099 A1 | 3/2014 |

\* cited by examiner

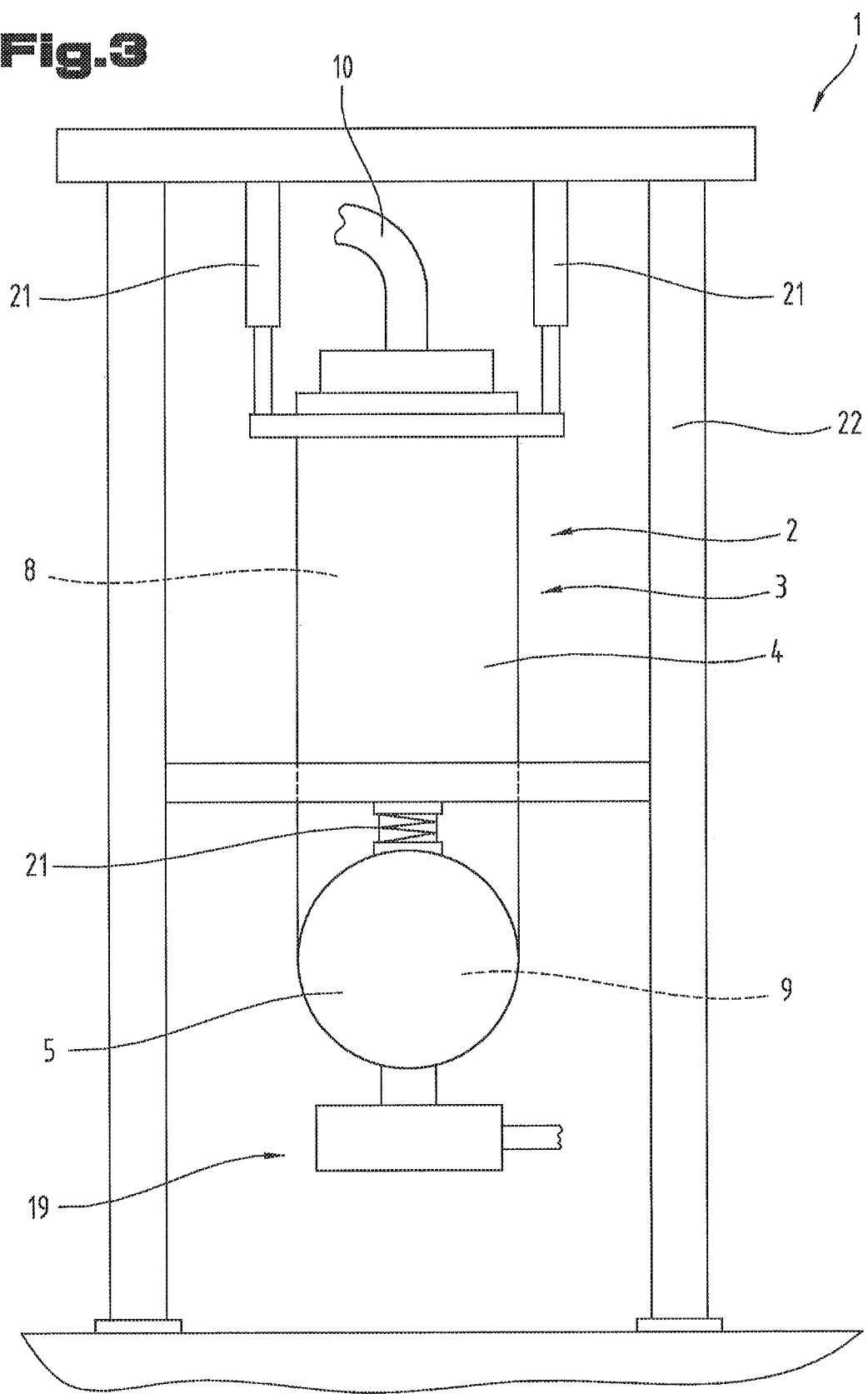

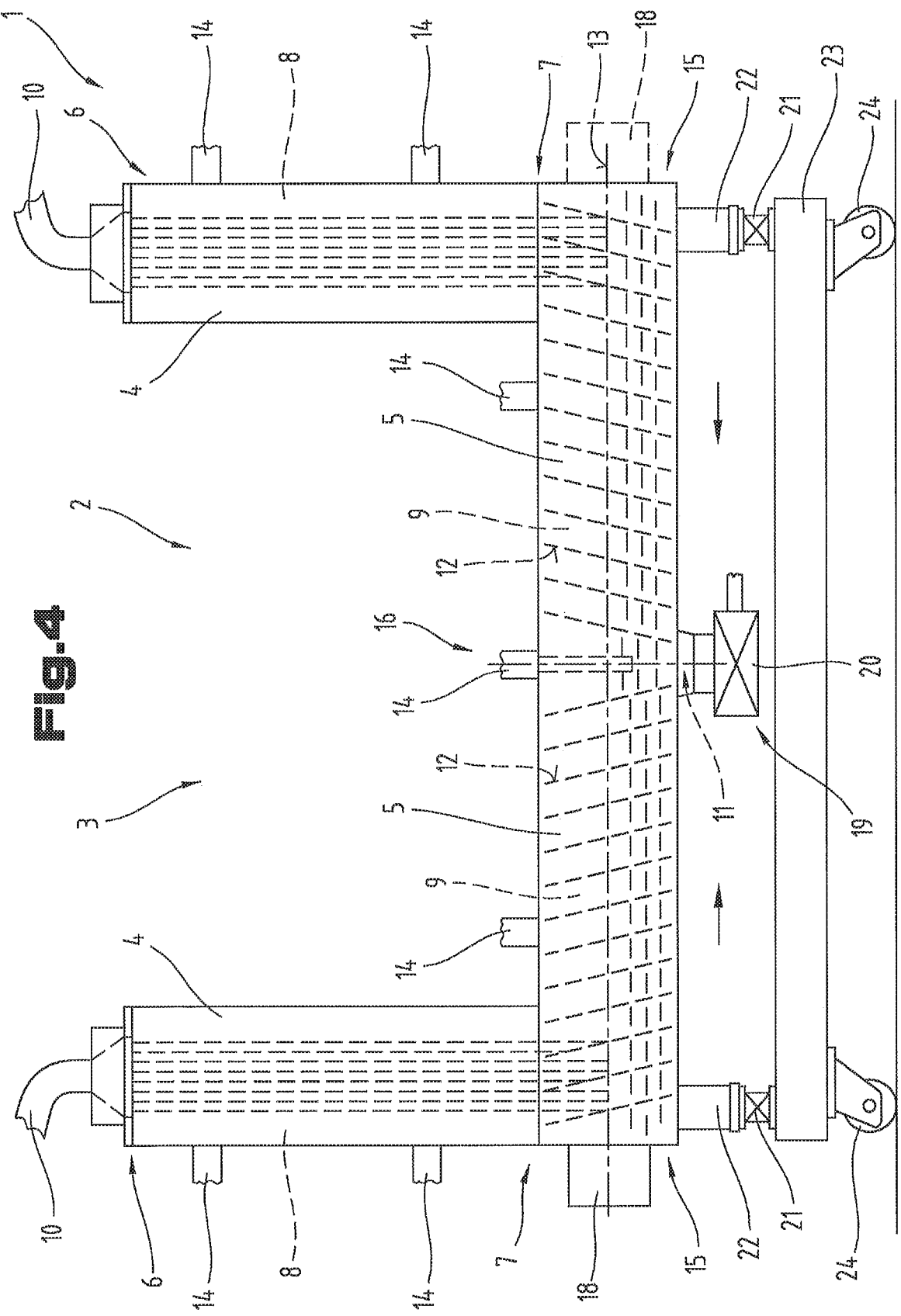

INSTALLATION AND METHOD FOR TREATING A PLASTIC MELT

CROSS REFERENCE TO RELATED APPLICATIONS

This application is the National Stage of PCT/AT2016/050074 filed on Mar. 23, 2016, which claims priority under 35 U.S.C. § 119 of Austrian Application Nos. A 50232/2015 filed on Mar. 23, 2015, and A 50233/2015 filed on Mar. 23, 2015, the disclosures of which are incorporated by reference. The international application under PCT article 21(2) was not published in English.

The invention relates to installations and methods for treating a plastics melt, in particular a polycondensate melt, and setting the intrinsic viscosity thereof.

WO 2014/040099 A1, from the same applicant, describes a method and a device for increasing the intrinsic viscosity of a polycondensate melt under negative pressure. The melt passes through a perforated plate or a screen with multiple openings into a chamber in which a pressure of lower than 20 mbar prevails, and said melt passes through said chamber in a free-falling manner in thin filaments and, below the chamber, dwells in a collecting vessel for at least one minute. In the collecting vessel, the melt is moved constantly, in a vacuum, by a mixing and discharge part which is oriented in a horizontal position in relation to a base of the collecting vessel, wherein the mixing and discharge part is not fully covered by the melt. A free space remains above the melt, wherein the surface of the melt is repeatedly broken up and repeatedly renewed as a result of a rotational movement of the mixing and discharge part. As a result of the dwell of the melt and the fact that said melt is kept in motion, the polycondensation in the melt bath, which began in the thin filaments, is continued. The melt is finally discharged from the collecting vessel by the jointly formed mixing and discharge part.

JP 2002/254432 A describes a receiving funnel for receiving a material to be plasticized, which is conveyed in intermittent fashion to a plasticizing unit of an injection-molding machine by means of a conveying device driven by a motor. The receiving funnel together with the motor and the conveying device are mounted on a weighing cell. By means of the weighing cell, the weight of the material received in the receiving funnel can be determined, and it is thus possible to determine whether enough material is available for the onward conveyance to the plasticizing unit of the injection-molding machine. Furthermore, the weight of the discharge quantity of material that is conveyed onward to the plasticizing unit of the injection-molding machine can be determined. This is however possible only for as long as no new material is fed into the receiving funnel during the onward conveyance. By coordinating the weight of the feed quantity of material fed into the receiving funnel with the weight of the intermittently discharged discharge quantity, it is thus possible to determine and establish a material throughput which is continuous in a predetermined time period and which is conveyed to the downstream injection-molding unit. A disadvantage here is that no direct quantity or mass monitoring of the supplied raw material is possible as far as the point at which the melt discharged is from the extruder.

JP 2011-131381 A has disclosed an installation of similar design which comprises a first filling funnel and a second filling funnel arranged below the discharge section. The discharge section of the second filling funnel opens into a conveyor. The second filling funnel and the conveyor arranged therebelow are jointly supported on a weighing device. In this way, a change in the weight of the raw material supplied to the second filling funnel and discharged can be determined. The raw material is fed by the conveyor to an extruder arranged downstream. In this case, too, it is in turn a disadvantage that no direct quantity or mass monitoring of the supplied raw material is possible as far as the point at which the melt discharged is from the extruder.

EP 1 302 501 A2 has disclosed a method and a device for promoting the post-polycondensation of polymer products. The previously prepared melt is conveyed through an extrusion plate with a multiplicity of holes, in order that the melt assumes a filament form as it passes through a vacuum chamber in a vertical direction. Below the chamber, there is arranged a collecting vessel in which a melt bath is formed from the individual melt filaments. A partial amount is extracted from said melt bath and is fed, as already-treated melt, in a particular quantity ratio to the feed line of the molten raw product. Said mixture for forming the melt from the raw product, and the additionally fed, already-treated melt product, is fed again through the extrusion plate with a multiplicity of holes to the chamber with the reduced pressure. A discharge line to a transfer pump is connected to the lower end of the collecting vessel which is in the form of a funnel.

DE 2 243 024 A describes a device for producing macromolecular PET. The device is composed of a vertically arranged, cylindrical vessel with a melt inlet at its upper end and with a melt outlet at the lower end and with extraction ports for volatile substances. In the middle of the vessel, a shaft is arranged vertically, around which shaft there are arranged vertical, static mass transfer plates. A distributor space is provided in each case above the mass transfer plates, and a collecting space is provided below said mass transfer plates. Between a distributor space and the collecting space of the stage situated thereabove, there is fitted a connecting pipe through which the shaft is guided. The shaft is, at the parts projecting through the connecting pipe, formed in each case as an extruder shaft which imparts a conveying action into the distributor space.

WO 2012/119165 A1 describes both a method and a device for removing contaminants from a plastics melt under negative pressure. The plastics melt is in this case fed through a perforated plate or a screen with multiple openings to a chamber in which a pressure of lower than 20 mbar prevails. The melt emerging from the openings forms in this case thin filaments which pass in a free-falling manner through the chamber, and below the chamber, said melt is collected in a collecting vessel in the form of a collecting funnel, and said melt dwells therein until the melt flows out of, or is extracted from, the collecting funnel through an outlet opening at a lower end of the collecting funnel. Only said outlet opening is adjoined by a melt pump or a conveying screw by means of which the plastics melt can be pumped to a connecting line or a collecting line.

The problem addressed by the present invention is that of creating constant treatment conditions in the ongoing treatment process for the plastics melt in order to obtain uniform material quality of the treated plastics melt.

Said problem addressed by the invention can be solved, with an installation for treating a plastics melt, in particular a polycondensate melt, and setting the intrinsic viscosity thereof, having a reactor which has a reactor housing with at least one first reactor housing part with an upper end region and a lower end region and which has a chamber part extending between the upper and lower end regions, wherein the first chamber part has a vertical height extent, and the reactor housing has, in the region of the lower end region of the at least first reactor housing part, an at least second reactor housing part which directly adjoins said first reactor housing part and which has a second chamber part, wherein the two chamber parts are connected to one another in terms of flow and are formed so as to be sealed off with respect to the external surroundings, and in the region of the upper end region of the first reactor housing part, at at least one inlet opening, at least one feed line for the plastics melt opens into the first reactor housing part, and at least one outlet opening for the plastics melt is arranged in the second reactor housing part, and having at least one mixing element which is arranged in the second reactor housing part, which mixing element is mounted in the second reactor housing part so as to be rotatable about an axis of rotation, and wherein the mixing element is connected in terms of drive to a dedicated, independent first drive device, in that the reactor is supported on a standing surface with the interposition of at least one weight-determining device, and in that a discharge device for the plastics melt is arranged so as to adjoin the outlet opening of the second reactor housing part, which discharge device is in the form of a melt pump or in the form of an extruder, wherein the discharge device is also supported on the standing surface with the interposition of at least one weight-determining device, and in that the discharge device is connected in terms of drive to a second drive device, wherein the second drive device is driven independently of the first drive device of the mixing element.

The advantage thereby achieved lies in the fact that it is thus made possible for the quantity or weight balance of the plastics melt to be kept constant within certain predefined limits during the ongoing operation of the installation. It is however thereby also possible for the quality of the plastics melt and, in association therewith, the intrinsic viscosity to be set, and maintained relatively constantly, in a manner dependent on the extraction quantity or the extraction weight. Thus, through the ongoing possible monitoring of the weight, a balanced equilibrium of extracted weight in relation to the weight of plastics melt to be fed can be set at all times. It is however thus also possible for the level of the melt surface to be maintained relatively constantly, whereby an adequate free space remains above the melt surface at all times, and thus the further treatment of the melt by means of the mixing element can act on the melt in unimpeded fashion. Through the provision of a dedicated discharge device, it is thus possible for the extraction of the treated melt to be performed independently of the mixing element. By means of this separation, it is thus possible for the intensity and the duration of the mixing process to be implemented independently of the extraction until the predetermined values of the melt to be treated have been attained. By means of the dedicated support, it is however thus also possible to determine that weight fraction of melt which is still situated in the region of the installation. In this way, an even better adapted treatment result for the melt can thus be attained.

If the mixing element is connected in terms of drive to a dedicated, independent first drive device, then a mixing process which is independent of the discharge quantity is made possible for the purposes of achieving the desired intrinsic viscosity. As a result of the separation of the drive of mixing element and discharge device, the intensity and duration of the mixing process can be implemented until the extraction of the melt has to be performed.

If the discharge device is connected in terms of drive to a second drive device, and the second drive device is driven independently of the first drive device of the mixing element, it is thus possible for the extraction quantity or the extraction weight of melt from the reactor to be defined independently of the mixing and treatment process to be performed.

It is furthermore advantageous if the installation furthermore comprises at least one support frame, and at least the reactor, in particular the reactor housing thereof, is held on the at least one support frame. In this way, targeted support, and furthermore exactly predefined support points, can be realized.

Another embodiment is distinguished by the fact that the support frame together with the reactor held thereon is supported on the standing surface via several of the weight-determining devices. It is thus possible to achieve an exact determination of the overall weight.

A further possible embodiment has the features whereby the at least one weight-determining device is arranged close to the ground in relation to the standing surface.

A further embodiment provides that the at least one weight-determining device is, at its side averted from the reactor or from the support frame and facing toward the standing surface, supported on a base frame, and the base frame is supported on the standing surface via wheels. In this way, the setup location of the reactor can be moved. Furthermore, in this way, it is also possible to realize an individual orientation of the reactor together with support frame relative to other installation components.

Another embodiment is distinguished by the fact that at least the reactor, in particular the reactor housing thereof, is held on the support frame, in a suspended position on the support frame, via the at least one weight-determining device. It is thus likewise possible for a weight determination to be performed easily and reliably in all operating states. It is however furthermore possible in this way for possible vibrations or other disturbance influences to be better intercepted and compensated.

A further preferred embodiment is distinguished by the fact that the at least one weight-determining device is formed by a weighing cell or a set of tension scales, wherein the at least one weight-determining device has a communication connection to a control device. In this way, a controlled and/or regulated treatment process can be achieved, in order to thereby be able to more exactly adhere to the intrinsic viscosity value of the melt that is to be set.

It is furthermore advantageous if the first reactor housing part and/or the second reactor housing part are/is of tubular form. In this way, a defined longitudinal extent and an associated treatment path for the melt can be formed.

Another embodiment is distinguished by the fact that the second reactor housing part has a longitudinal extent which is oriented so as to run approximately horizontally and which has first and second end regions at a distance from one another. In this way, a treatment space can be created which extends over the entire longitudinal extent of the second reactor housing part, in order to thereby be able to achieve optimum treatment of the melt.

A further possible embodiment has the features whereby the axis of rotation of the mixing element is arranged coaxially with respect to the second reactor housing part of tubular form.

In this way, in particular in the case of pipes or pipe pieces with a circular internal cross section, it is possible for an excessive accumulation of melt to be prevented in a manner dependent on the outer cross-sectional dimensions of the mixing element.

A further embodiment provides that the mixing element is arranged with a minimum spacing of less than 1.0 mm to an inner wall of the second reactor housing part. In this way, not only a good and adequate mixing action but also a certain stripping effect on the vessel inner wall can be achieved.

It is furthermore advantageous if the mixing element is arranged with a minimum spacing of greater than 1.0 mm, in particular greater than 20 mm, to the inner wall of the second reactor housing part. As a result of the enlargement of the gap spacing, it is thus possible for a certain backflow of melt during the mixing and treatment process to be permitted, whereby an even better treatment action can be achieved as a result of the internal circulation of the melt.

Another embodiment is distinguished by the fact that the mixing element extends over the longitudinal extent of the second chamber part between the first and second end regions, which are arranged at a distance from one another, of the second reactor housing part and is arranged entirely in the second chamber part. The advantage thereby achieved lies in the fact that, in this way, within the second reactor housing part, the full length is available for the treatment of the plastics melt by means of the mixing element.

A further possible embodiment has the features whereby the two chamber parts, which are connected to one another in terms of flow, of the two reactor housing parts are connected in terms of flow to a negative-pressure generator via at least one port opening and at least one suction-extraction line. Thus, those constituents which form and are to be discharged from the ongoing treatment process and which do not belong to the melt can be discharged from the reactor interior space. Furthermore, it is however also possible in this way for the polycondensation process to be commenced within the melt and continued further.

A further embodiment provides that the at least one suction-extraction line is equipped, at least in regions, with a heating element. Thus, a condensation of constituents, in particular of water or other substances to be discharged, within the suction-extraction lines can be prevented.

Another embodiment is distinguished by the fact that the at least one outlet opening for the plastics melt is arranged in the region of the second end region of the second reactor housing part and in a base region of the latter, said second end region being arranged at a distance from the first reactor housing part. Thus, a targeted extraction region for the melt from the reactor housing part can be realized.

The problem addressed by the invention is however also solved, independently thereof, by means of a method for treating a plastics melt, in particular a polycondensate melt, and setting the intrinsic viscosity thereof, as per the features according to another aspect of the invention. The advantages achieved from the combination of features of this aspect of the invention lie in the fact that it is thus made possible for the quantity or weight balance of the plastics melt to be kept constant within certain predefined limits during the ongoing operation of the installation, in particular of the reactor together with the discharge device.

By means of the dedicated support of the discharge device, it is however thus also possible to determine that weight fraction of melt which is still situated in the region of the installation. In this way, an even better adapted treatment result for the melt can thus be attained.

Moreover, it is however thereby also possible for the quality of the plastics melt and, in association therewith, the intrinsic viscosity to be set, and maintained relatively constantly, in a manner dependent on the extraction quantity or the extraction weight. Thus, through the ongoing possible monitoring of the weight of the reactor together with the discharge device, a balanced equilibrium of extracted weight in relation to the weight of plastics melt to be fed can be set at all times. It is however thus also possible for the level of the melt surface to be maintained relatively constantly, whereby an adequate free space remains above the melt surface at all times, and thus the further treatment of the melt by means of the mixing element can act on the melt in unimpeded fashion.

If the mixing element is driven by a dedicated, independent first drive device, a mixing process which is independent of the discharge quantity is thus made possible for the purposes of achieving the desired intrinsic viscosity. As a result of the separation of the drive of mixing element and discharge device, the intensity and duration of the mixing process can be implemented until the extraction of the melt has to be performed.

It is advantageous if the discharge device which is arranged so as to adjoin the outlet opening arranged in the second reactor housing part is driven by a second drive device, wherein the second drive device is driven independently of the first drive device of the mixing element. In this way, the extraction quantity or the extraction weight of melt from the reactor can be defined independently of the mixing and treatment process to be performed.

Another approach is distinguished by the fact that the plastics melt to be treated which is fed to the reactor is split up into a multiplicity of thin melt filaments in the first reactor housing part, and the thin melt filaments pass in a free-falling manner through the first chamber part. In this way, as a result of the melt being split up into filament form, an even better treatment process thereof can be achieved. In this way, constituents to be discharged can pass to the surface, and thus be discharged from the reactor, in an even more effective manner.

A method variant is also advantageous in which the plastics melt in the second chamber part of the second reactor housing part is moved and mixed constantly by the mixing element. In this way, the treatment process that has begun in the first reactor part, in particular the polycondensation, is continued further, and thus the intrinsic viscosity is further increased.

A further advantageous approach is distinguished by the fact that the chamber parts enclosed by the two reactor housing parts are evacuated to a pressure of lower than 100 mbar. In this way, an even better treatment result can be achieved.

A method variant is also advantageous in which the melt surface of the melt bath in the second chamber part is formed with a length extent approximately equal to that of the mixing element, and thus the pressure of lower than 100 mbar acts on the melt surface of the melt bath during the mixing thereof. The advantage thereby achieved lies in the fact that, in this way, within the second reactor housing part, the full length is available for the treatment of the plastics melt by means of the mixing element.

Furthermore, an approach is advantageous in which the melt surface of the plastics melt is, in the case of the predefined setpoint fill level in the second chamber part of the second reactor housing part, situated approximately in the middle of the height of the second chamber part. In this way, a break-up of the melt surface and the constant renewal thereof can take place in the free space that remains above the melt surface. In the case of a negative pressure prevailing in the reactor interior space, it is thus however also possible for this to be brought fully to bear on the melt.

Furthermore, an approach is advantageous in which the extraction of the treated plastics melt from the second chamber part is performed below the melt surface at an angle of 30°, preferably 90°, with respect to a longitudinal axis of the second reactor housing part. It is thus furthermore possible to prevent a situation in which, in the case of a relatively low fill level, the melt surface extends into the extraction opening and thus an interruption of the extraction of plastics melt possibly becomes necessary. This can, as a further consequence, lead to undesired interruptions of the otherwise continuous extraction process.

Furthermore, an approach is advantageous in which, by means of a measurement device, a measurement value of the intrinsic viscosity of the treated plastics melt is determined in the region of the outlet opening or in a discharge section, directly adjoining said region, of the plastics melt. In this way, a direct determination of the intrinsic viscosity can be performed at all times during the ongoing treatment process, and thus the treatment process to be performed can be quickly intervened in such that no or only a small amount of waste material is generated.

Said problem addressed by the invention can however also be solved in that the reactor housing comprises two first reactor housing parts and two second reactor housing parts, and in that the two horizontally arranged second reactor housing parts are, at their second end regions, arranged so as to face toward one another and are connected to one another at the second end regions to form a unit, and in that the at least one outlet opening is arranged in a base region of the second reactor housing part, and in that the at least one mixing element extends in each case over the longitudinal extent of the second chamber parts between the first and second end regions, which are arranged at a distance from one another, of the second reactor housing parts and is arranged entirely in each of the second chamber parts.

The advantages thereby achieved lie in the fact that, through the respective twofold provision of reactor housing parts, a greater quantity of melt can be treated in an associated reactor, and at the same time, the quality of the treated melt can be further improved. Through the simultaneous treatment of the melt, beginning in each case in the two vertically oriented first reactor housing parts, and the subsequent further treatment in the second reactor housing parts, it is thus possible, with a relatively small space requirement and outlay in terms of apparatus, to realize rapid treatment of the melt, and at the same time to achieve a greater quantity throughput per unit of time. Furthermore, in this way, within the second reactor housing parts, the full length is available for the treatment of the plastics melt by means of the mixing element, and it is furthermore possible for a targeted extraction region for the melt from the reactor housing parts to be realized. It is thus furthermore possible to prevent a situation in which, in the case of a relatively low fill level, the melt surface extends into the extraction opening and thus an interruption of the extraction of plastics melt possibly becomes necessary. This can, as a further consequence, lead to undesired interruptions of the otherwise continuous extraction process. Furthermore, as a result of the mixing element being arranged entirely within the chamber part, uninterrupted treatment of the melt can be performed in a manner uninfluenced by the extraction. It is thus furthermore possible for even more targeted, more intense treatment of the melt to be performed, whereby an even better or higher intrinsic viscosity can be achieved. Thus, those constituents which form and are to be discharged from the ongoing treatment process and which do not belong to the melt can be discharged from the reactor interior space. Furthermore, it is however also possible in this way for the polycondensation process to be commenced within the melt and continued further. It is however furthermore also possible for a treatment space to be created which extends over the entire longitudinal extent of the second reactor housing parts, in order to thereby be able to achieve optimum treatment of the melt.

It is furthermore advantageous if the first reactor housing parts and/or the second reactor housing parts are of tubular form. In this way, a defined longitudinal extent and an associated treatment path for the melt can be formed.

Another embodiment is distinguished by the fact that the axis of rotation of the mixing element is arranged coaxially with respect to the second reactor housing part of tubular form. In this way, in particular in the case of pipes or pipe pieces with a circular internal cross section, it is possible for an excessive accumulation of melt to be prevented in a manner dependent on the outer cross-sectional dimensions of the mixing element.

A further possible embodiment has the features whereby the mixing element is arranged with a minimum spacing of less than 1.0 mm to an inner wall of the second reactor housing part. In this way, not only a good and adequate mixing action but also a certain stripping effect on the vessel inner wall can be achieved.

It is furthermore advantageous if the mixing element is arranged with a minimum spacing of greater than 1.0 mm, in particular greater than 20 mm, to the inner wall of the second reactor housing part. As a result of the enlargement of the gap spacing, it is thus possible for a certain backflow of melt during the mixing and treatment process to be permitted, whereby an even better treatment action can be achieved as a result of the internal circulation of the melt.

A further embodiment provides that an independent mixing element is provided in each of the second reactor housing parts, and each of the mixing elements is connected in terms of drive to a dedicated, independent first drive device. Thus, a mixing process which is independent of the discharge quantity is made possible for the purposes of achieving the desired intrinsic viscosity. As a result of the separation of the drive of mixing element and discharge device, the intensity and duration of the mixing process can be implemented until the extraction of the melt has to be performed.

A further possible embodiment has the features whereby the mixing elements arranged in the two second reactor housing parts are connected to one another to form one coherent component, and the mixing elements have oppositely oriented gradients. It is thus possible for the mixing element to be driven by means of one single first drive device, whereby installation parts can be saved. Owing to the oppositely oriented gradients, in the case of the mixing elements being rotated in the same direction, a conveying movement of the melt directed toward the at least one outlet opening arranged in the end regions facing toward one another is nevertheless achieved.

A further possible embodiment has the features whereby the at least one outlet opening in the second reactor housing part is arranged at an angle of 30°, preferably of 90°, below a horizontal plane running through a longitudinal axis of the second reactor housing part.

Another embodiment is distinguished by the fact that a discharge device for the plastics melt is arranged so as to adjoin the at least one outlet opening in the second reactor housing part. Through the provision of a dedicated discharge device, it is thus possible for the extraction of the treated melt to be performed independently of the mixing element. As a result of said separation, it is thus possible for the intensity and duration of the mixing process to be implemented independently of the extraction until the predetermined values of the melt to be treated have been attained.

A further preferred embodiment is distinguished by the fact that the discharge device is connected in terms of drive to a second drive device, wherein the second drive device is driven independently of the one or more first drive devices of the one or more mixing elements. In this way, the extraction quantity or the extraction weight of melt from the reactor can be defined independently of the mixing and treatment process to be performed.

It is furthermore advantageous if the reactor is supported on a standing surface with the interposition of at least one weight-determining device. The advantage thereby achieved lies in the fact that it is thus made possible for the quantity or weight balance of the plastics melt to be kept constant within certain predefined limits during the ongoing operation of the installation. Moreover, it is however thereby also possible for the quality of the plastics melt and, in association therewith, the intrinsic viscosity to be set, and maintained relatively constantly, in a manner dependent on the extraction quantity or the extraction weight. Thus, through the ongoing possible monitoring of the weight, a balanced equilibrium of extracted weight in relation to the weight of plastics melt to be fed can be set at all times. It is however thus also possible for the level of the melt surface to be maintained relatively constantly, whereby an adequate free space remains above the melt surface at all times, and thus the further treatment of the melt by means of the mixing element can act on the melt in unimpeded fashion.

Another embodiment is distinguished by the fact that the installation furthermore comprises a support frame, and at least the reactor, in particular the reactor housing thereof, is held on the support frame. In this way, targeted support, and furthermore exactly predefined support points, can be realized.

A further possible embodiment has the features whereby the support frame together with the reactor held thereon is supported on the standing surface via several of the weight-determining devices. It is thus possible to achieve an exact determination of the overall weight.

A further embodiment provides that the at least one weight-determining device is arranged close to the ground in relation to the standing surface.

Another embodiment is distinguished by the fact that the at least one weight-determining device is, at its side averted from the reactor or from the support frame and facing toward the standing surface, supported on a base frame, and the base frame is supported on the standing surface via wheels. In this way, the setup location of the reactor can be moved. Furthermore, in this way, it is also possible to realize an individual orientation of the reactor together with support frame relative to other installation components.

A further preferred embodiment is distinguished by the fact that at least the reactor, in particular the reactor housing thereof, is held on the support frame, in a suspended position on the support frame, via the at least one weight-determining device. It is thus likewise possible for a weight determination to be performed easily and reliably in all operating states. It is however furthermore possible in this way for possible vibrations or other disturbance influences to be better intercepted and compensated.

It is furthermore advantageous if the at least one weight-determining device is formed by a weighing cell or a set of tension scales, wherein the at least one weight-determining device has a communication connection to a control device. In this way, a controlled and/or regulated treatment process can be achieved, in order to thereby be able to more exactly adhere to the intrinsic viscosity value of the melt that is to be set.

Another embodiment is distinguished by the fact that the discharge device is also supported on the standing surface with the interposition of at least one weight-determining device. By means of the dedicated support, it is however thus also possible to determine that weight fraction of melt which is still situated in the region of the installation. In this way, an even better adapted treatment result for the melt can thus be attained.

The problem addressed by the invention can however also be solved, independently thereof, by means of a further method for treating a plastics melt, in particular a polycondensate melt, and setting the intrinsic viscosity thereof, as per the features specified in claim 47. The advantages achieved from the combination of features of said claim lie in the fact that, in this way, through the provision of in each case two first and second reactor housing parts, the quantity of melt to be treated per unit of time can be increased, and in the process, the productivity can be increased while maintaining adequately good quality of the melt at the outlet from the reactor. Thus, an individual treatment of the melt can be performed in each of the second reactor housing parts, wherein, in the central region, mixing of the two melts, and thus even finer and more accurate setting of the intrinsic viscosity of the melt extracted from the reactor, is possible. Furthermore, in this way, within the second reactor housing parts, the full length is available for the treatment of the plastics melt by means of the mixing element, and it is thus possible for a targeted extraction region for the melt from the second reactor housing parts to be realized. It is thus furthermore possible to prevent a situation in which, in the case of a relatively low fill level, the melt surface extends into the extraction opening and thus an interruption of the extraction of plastics melt possibly becomes necessary. This can, as a further consequence, lead to undesired interruptions of the otherwise continuous extraction process. Furthermore, as a result of the mixing element being arranged entirely within the chamber parts, uninterrupted treatment of the melt can be performed in a manner uninfluenced by the extraction. It is thus furthermore possible for even more targeted, more intense treatment of the melt to be performed, whereby an even better or higher intrinsic viscosity can be achieved.

A further advantageous approach is distinguished by the fact that an independent mixing element is provided in each of the second reactor housing parts, and each of the mixing elements is driven by a dedicated, independent first drive device. Thus, a mixing process which is independent of the discharge quantity is made possible for the purposes of achieving the desired intrinsic viscosity. As a result of the separation of the drive of mixing element and discharge device, the intensity and duration of the mixing process can be implemented until the extraction of the melt has to be performed.

Furthermore, an approach is advantageous in which the mixing elements arranged in the two second reactor housing parts are connected to one another to form one coherent component, and the mixing elements are formed with oppositely oriented gradients. Thus, the mixing element can be driven by means of a single first drive device, whereby installation parts can be saved.

A method variant is also advantageous in which the plastics melt in each of the second chamber parts of the second reactor housing parts is moved and mixed constantly by the mixing element. In this way, the treatment process that has begun in the first reactor part, in particular the polycondensation, is continued further, and thus the intrinsic viscosity is further increased.

Another approach is distinguished by the fact that a discharge device which is arranged so as to adjoin the outlet opening arranged in the second reactor housing part is driven by a second drive device, wherein the second drive device is driven independently of the one or more first drive devices of the one or more mixing elements. In this way, the extraction quantity or the extraction weight of melt from the reactor can be defined independently of the mixing and treatment process to be performed.

Furthermore, an approach is advantageous in which, firstly, by means of at least one weight-determining device, a first measurement value of the weight of the reactor itself without the plastics melt is determined and transmitted to a control device and is possibly stored in the latter, the plastics melt to be treated is subsequently fed to the reactor and, when a predefined fill level of the plastics melt, and the associated level of the melt surface, in the second chamber parts of the second reactor housing parts is reached, a second measurement value is, by means of the at least one weight-determining device, determined and transmitted to the control device and is possibly stored in the latter, and then, by means of the control device, a differential value is determined from the second measurement value minus the first measurement value, and in that, by means of the control device, in a manner dependent on the weight of treated plastics melt extracted from the second reactor housing parts, the weight of fed plastics melt to be treated is, within predefined limits, kept in equilibrium with respect to the previously determined differential value. The advantages thereby achieved lie in the fact that it is thus made possible for the quantity or weight balance of the plastics melt to be kept constant within certain predefined limits during the ongoing operation of the installation. Furthermore, it is however thereby also possible for the quality of the plastics melt and, in association therewith, the intrinsic viscosity to be set, and maintained relatively constantly, in a manner dependent on the extraction quantity or the extraction weight. Thus, through the ongoing possible monitoring of the weight, a balanced equilibrium of extracted weight in relation to the weight of plastics melt to be fed can be set at all times. It is however thus also possible for the level of the melt surface to be maintained relatively constantly, whereby an adequate free space remains above the melt surface at all times, and thus the further treatment of the melt by means of the mixing element can act on the melt in unimpeded fashion.

A further advantageous approach is distinguished by the fact that the discharge device is also supported on the standing surface with the interposition of at least one weight-determining device. By means of the dedicated support, it is however thus also possible to determine that weight fraction of melt which is still situated in the region of the installation. In this way, an even better adapted treatment result for the melt can thus be attained.

A method variant is also advantageous in which, by means of a measurement device, a measurement value of the intrinsic viscosity of the treated plastics melt is determined in the region of the outlet opening or in a discharge section, directly adjoining said region, of the plastics melt. In this way, a direct determination of the intrinsic viscosity can be performed at all times during the ongoing treatment process, and thus the treatment process to be performed can be quickly intervened in such that no or only a small amount of waste material is generated.

Another approach is distinguished by the fact that the melt surface of the plastics melt is, in the case of the predefined fill level in the second chamber parts of the second reactor housing parts, situated approximately in the middle of the height of the second chamber parts. In this way, a break-up of the melt surface and the constant renewal thereof can take place in the free space that remains above the melt surface. In the case of a negative pressure prevailing in the reactor interior space, it is however thus also possible for this to be brought fully to bear on the melt.

For improved understanding of the invention, the invention will be discussed in more detail on the basis of the following figures.

In the figures, in each case in a highly simplified schematic illustration:

FIG. 3 shows another possible arrangement of the support of the reactor on the standing surface;

FIG. 4 shows a further possible design variant of a reactor with an arrangement of multiple reactor housing parts, in a view.

By way of introduction, it is pointed out that, in the various embodiments described, identical parts are denoted by the same reference designations or the same component names, wherein the disclosures contained in the description as a whole are analogously transferable to identical parts with the same reference designations or the same component names. Also, the positional terms chosen in the description, such as for example upward, downward, laterally etc., relate to the figure respectively being described and presented, and in the case of a change in position, said positional terms must be analogously transferred to the new position.

Below, the expression "in particular" is to be understood to mean that what is being referred to may constitute a possible more specific embodiment or a more precise specification of a subject or of a method step, but need not imperatively represent an mandatory preferred embodiment thereof or an approach.

Figure 1:
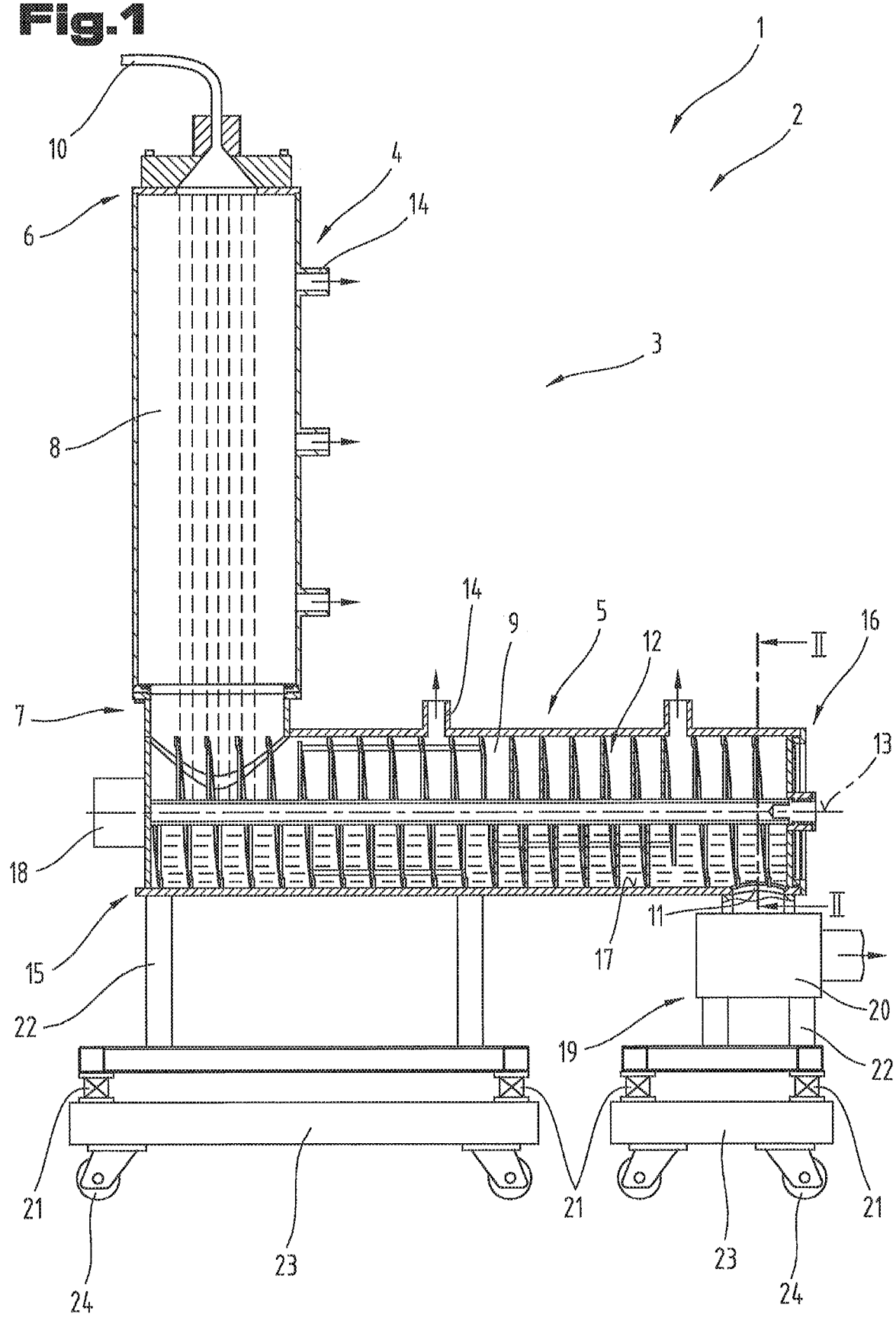
FIG. 1 shows a part of an installation with a reactor for treating the plastics melt, in section.
Figure 2:
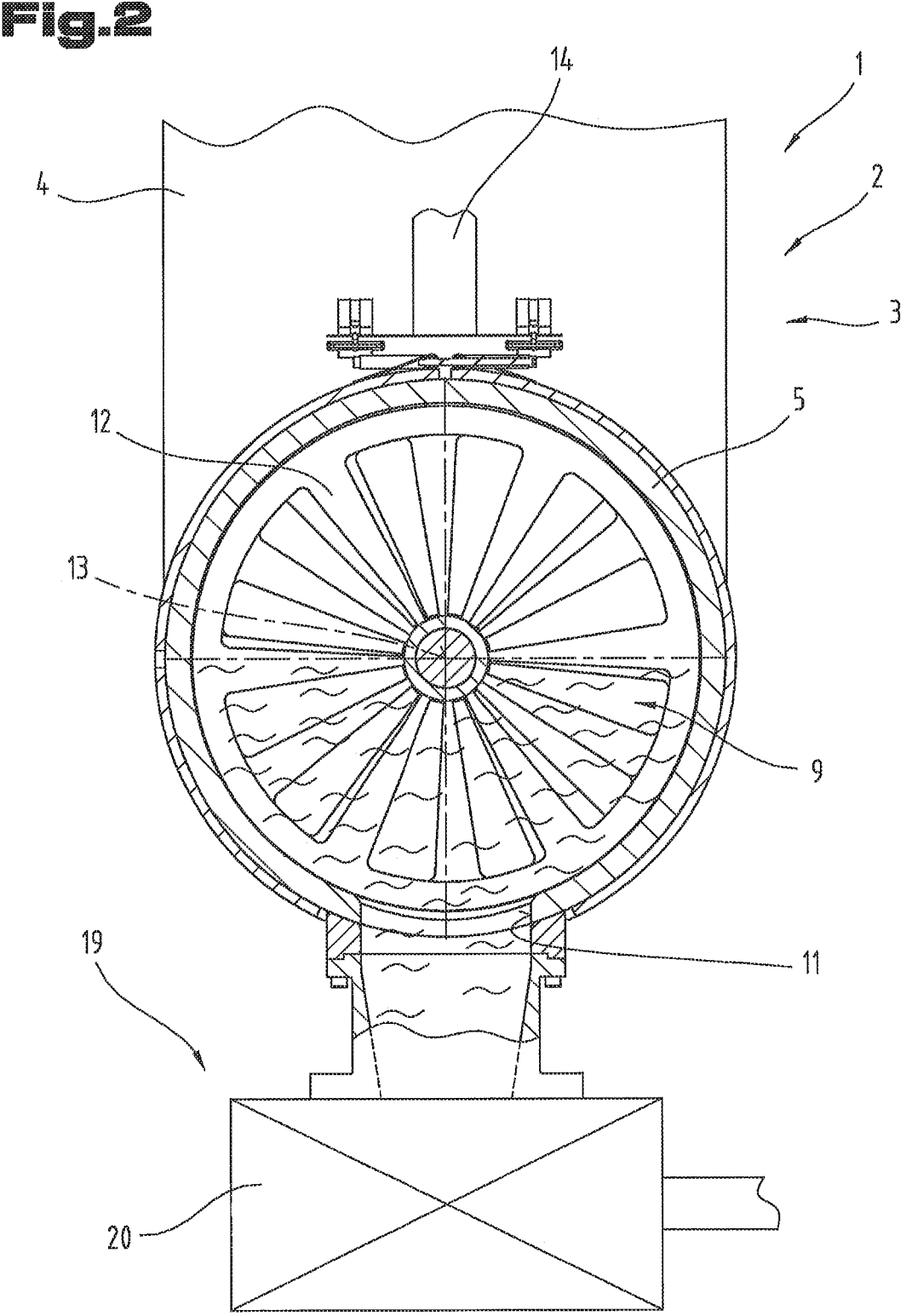
FIG. 2 shows a part of the reactor housing in cross section, as per the lines II-II in FIG. 1.

FIGS. 1 to 3 show, in simplified form, a part of an installation 1 for treating a plastics melt, in particular a polycondensate melt. Treatment is to be understood in particular to mean the setting of the intrinsic viscosity thereof. Normally, or preferably, the plastics melt is formed either from new material or else from recycled material. If recycled materials are used, for example, the plastics melt has a lower intrinsic viscosity value owing to the processing that has already been performed to create a product. To increase the intrinsic viscosity value of the plastics melt, in the case of polycondensates, a polycondensation process must be performed, in which monomers are linked together by splitting off reaction products, such as for example water. Said linking process is associated with chain growth, whereby the molecule chain lengths also increase, which has a significant influence on the mechanical characteristics of products produced therefrom. This process is of significance not only in the production of new goods but plays a major role very particularly in the recycling of such products. The recycled material to be processed may for example firstly be sorted, comminuted, possibly cleaned, melted, degassed and filtered. This plastics melt thus prepared is treated in the installation 1 in order not only to further purify said plastics melt of undesired additives but also to set the intrinsic viscosity to the desired value. This normally involves an increase of the intrinsic viscosity, though may also encompass a lowering thereof. The polycondensates are thermoplastics, such as for example PET, PBT; PEN, PC, PA or materials composed of polyester or the like.

The installation 1 shown here comprises inter alia a reactor 2 with a reactor housing 3 which is illustrated in simplified form and which itself has at least one first reactor housing part 4 and, directly adjoining the latter, at least one second reactor housing part 5. The first reactor housing part 4 in turn has an upper end region 6 and, arranged at a distance therefrom, a lower end region 7. A first chamber part 8 extends within the reactor housing part 4 between the upper end region 6 and the lower end region 7. The first reactor housing part 4 preferably has a vertical orientation between its upper end region 6 and its lower end region 7, whereby the first chamber part 8 also has a vertical height extent within said first reactor housing part. The first reactor housing part 4 thus constitutes an approximately tower-like structure.

In the present exemplary embodiment, the at least second reactor housing part 5 is likewise a constituent part of the reactor housing 3 and is arranged in the region of the lower end region 7 of the at least first reactor housing part 4 so as to directly adjoin said first reactor housing part. The second reactor housing part 5 forms or encloses a second chamber part 9. The two chamber parts 8, 9 have a flow connection to one another, and are thus connected to one another, at least in the unfilled operating state of the reactor 2. It is preferably possible for each of the reactor housing parts 4, 5 to be assembled from one or else from multiple components. It is likewise also possible for different lengths or heights of the two reactor housing parts 4, 5 to be selected. To be able to prevent an ingress of ambient air into the chamber parts 8, 9 enclosed by the reactor housing parts 4, 5, said chamber parts may also be designed to be sealed off with respect to the external surroundings.

Furthermore, it is also illustrated here that, in the region of the upper end region 6 of the first reactor housing part 4, at at least one inlet opening, at least one feed line 10 for the plastics melt opens into the first reactor housing part 4. In this way, the plastics melt to be treated can, for the treatment thereof, be introduced into the first reactor housing part 4. To be able to discharge or extract the plastics melt from the reactor 2, in particular the reactor housing 3 thereof, again, at least one outlet opening 11 for the plastics melt is arranged or formed in the second reactor housing part 5 for this purpose.

For the further treatment of the plastics melt that is situated in the reactor housing 3, it is also provided here that, in the second reactor housing part 5, there may be arranged at least one mixing element 12 which is accommodated therein. The at least one mixing element 12 is mounted in the second reactor housing part 5 so as to be rotatable about an axis of rotation 13. Here, it is pointed out that the axis of rotation 13 need not imperatively constitute a physical shaft extending all the way through but may also constitute merely a fictitious axis. The mixing element 12 may be designed in a wide variety of different ways. For example, it would be possible for multiple disk-shaped elements to be arranged one behind the other for the purposes of mixing the plastics melt in the second reactor housing part 5. It would however also be possible for the mixing element 12 to be formed by one or more helical webs or the like. The mixing element 12 serves predominantly for keeping the melt surface, or the surface of the melt bath situated in the second chamber part 9 of the second reactor housing part 5, in motion and constantly renewing said melt surface by breaking it up. By means of this treatment process, it is for example possible for the polycondensation begun in the first chamber part 8 to be continued further, whereby a further increase in the intrinsic viscosity can be achieved. The mixing element 12 may be formed such that it performs only a mixing process without any conveying action. Independently of this, it is however also possible for a certain conveying action to be exerted on the plastics melt by the mixing element 12, in order thereby to realize targeted onward transport to the outlet opening 11. It is also possible for mutually different zones to be formed one behind the other.

The two reactor housing parts 4, 5 may be formed in a wide variety of ways with regard to their space shape, wherein preferably, the first reactor housing part 4 and/or the second reactor housing part 5 may be of tubular form. "Tubular" is preferably to be understood to mean a circular cross section. A cross-sectional dimension may for example have a diameter of approximately 600 mm. Other cross-sectional shapes, such as for example polygonal, oval or elliptical, would however also be conceivable. A length ratio of the two reactor housing parts 4, 5 with respect to one another may, based on the length or height of the first reactor housing part 4 relative to the length of the second reactor housing part 5, amount to for example 1:0.5 to 1:4, preferably 1:1 to 1:3.

Furthermore, in the upper end region 6 of the first reactor housing part 4, the melt flow fed via the feed line 10 may be conducted through a perforated plate or a screen, in particular forced through with a pressure acting on the melt, in order to thereby generate a multiplicity of thin melt filaments. The thin melt filaments pass through the first chamber part 8 in a free-falling manner. Here, the number of openings or holes may be correspondingly adapted to the mass throughput. Furthermore, by means of the height or length of the first reactor housing part 4, the falling duration of the melt flow or of the thin melt filaments can be influenced. The taller or longer the first reactor housing part 4 is formed to be, it is thus also possible for the treatment duration of the melt in said section to be influenced. Furthermore, thinning of the individual melt filaments may also occur owing to the gravitational force.

The reactor 2, in particular the reactor housing 3 thereof, may be kept at a corresponding temperature in a manner dependent on the plastics material to be treated. The temperature-control elements provided for this purpose can be supplied or operated with a wide variety of different temperature-control media. For example, liquid and/or gaseous temperature-control media may flow around the reactor 2, in particular the reactor housing 3 thereof. Use may however also be made of other energy carriers or energy forms, such as for example electrical energy.

As already described above, the chamber parts 8, 9 of the reactor housing parts 4, 5 are connected to one another in terms of flow and are sealed off with respect to the external surroundings. It is furthermore also possible for the chamber parts 8, 9 to be lowered in relation to the ambient pressure to a lower pressure in relation thereto. For this purpose, one or more port openings may be provided on at least one of the reactor housing parts 4, 5, which port openings are in turn connected in terms of flow to a negative-pressure generator (not illustrated in any more detail) via at least one suction-extraction line 14. To obtain, for example, a uniform lowered pressure within the chamber parts 8, 9, it is also possible for multiple port openings to be provided, wherein these may be arranged in a distributed manner both on the first reactor housing part 4 and/or on the second reactor housing part 5. The port openings and the suction-extraction lines 14 connected thereto are preferably arranged in the region of the second reactor housing part 5, at the top side thereof. The chamber parts 8 enclosed by the two reactor housing parts 4, 5 can be evacuated to a pressure of lower than 100 mbar. A pressure of between 0.5 mbar and 20 mbar is preferably selected. The greater the negative pressure, and thus the lower the absolute pressure, in the chamber parts 8, 9, the faster and more effective the treatment result of the plastics melt. This result is also dependent on the temperature prevailing in the chamber parts 8, 9, which is to be selected in accordance with the plastics material to be treated.

It would furthermore also be possible for different zones with mutually different pressure, that is to say with different levels of vacuum, to be provided within the first reactor housing part 4 and/or the second reactor housing part 5. In this way, within the chamber parts 8, 9, a differential vacuum can be realized in at least one of the reactor housing parts 4 and/or 5. This differential vacuum or the different pressure may be achieved for example by means of differential pumping. The different zones may be formed by perforated plates, screens, an intermediate plate or else narrowings in the reactor housing part 4, 5, or else other flow obstructions.

It is furthermore also possible for the at least one suction-extraction line 14 to be equipped or surrounded at least in regions with a heating element. The heating element may for example be a heating element which is operated with electrical energy. It would however also be possible for the suction-extraction line 14 to be surrounded on its outer side with a casing element arranged with a spacing thereto or at a distance therefrom, and for example for a temperature-control medium, for example a liquid or a gas, at a corresponding temperature to be conducted through the intermediate space formed between the suction-extraction line 14 and the casing element. In this way, it is possible for constituents that are to be extracted by suction from the chamber parts 8, 9 to be prevented from condensing in the suction-extraction lines 14.

As already described above, the first reactor housing part 4 has a preferably vertical orientation. In the present exemplary embodiment, the second reactor housing part 5 has a longitudinal extent which is oriented so as to run approximately horizontally and which has first and second end regions 15, 16 which are arranged at a distance from one another. In this way, an "L" shape of the two reactor housing parts 4, 5 is formed. The at least one mixing element 12 arranged in the second reactor housing part 5 preferably has, in the case of a circular cross section of the second reactor housing part 5, an arrangement running coaxially with respect thereto. Thus, in the case of a circular pipe, the axis of rotation 13 runs in the center of the reactor housing part 5.

Owing to this central or coaxial arrangement of the mixing element 12, said mixing element can be arranged with a minimum spacing of less than 1.0 mm to an inner wall 17 of the second reactor housing part 5. The smaller the minimum spacing of the mixing element 12 to the inner wall 17 is selected to be, the less plastics melt can accumulate on the inner wall 17 of the second reactor housing part 5, because, depending on the design of the mixing element 12, said mixing element can strip the deposited plastics melt from the inner wall 17 at least in regions. For example, it would thus also be possible, at the outer circumference of the mixing element 12, for said mixing element to be equipped with an additional attachment element (not illustrated in any more detail) which may then be in direct contact with the inner wall 17. Depending on the selection and hardness of the attachment element, it is thus possible for metallic contact between the mixing element 12 and the inner wall 17 of the reactor housing part 5 to be avoided. Furthermore, thermally induced changes in length between the cold state of the installation 1 and the operating state thereof must be allowed for.

Independently of this, it would however also be possible for the mixing element 12 to be arranged with a minimum spacing of greater than 1.0 mm, in particular greater than 50 mm, in particular greater than 150 mm, to the inner wall 17 of the second reactor housing part 5. By means of the enlargement of the minimum spacing, it is thus possible for a return flow and thus repeated circulation of the plastics melt situated in the second chamber part 9 to be achieved. In this way, it is for example also possible to achieve a yet further increase in the intrinsic viscosity.

In the present exemplary embodiment, the mixing element 12 extends over the longitudinal extent of the second chamber part 9 between the first and second end regions 15, 16, which are arranged at a distance from one another, of the second reactor housing part 5. In this way, it is furthermore the case that the mixing element 12 is arranged entirely in the second chamber part 9. Only the mounting of the mixing element 12 is realized for example on the end walls of the second reactor housing part 5.

Since the mixing element 12 extends over the internal longitudinal extent between the first end region 15 and the second end region 16 of the second reactor housing part 5, it is also the case that the melt surface of the melt bath in the second chamber part 9 is formed with a length extent approximately equal to that of the mixing element 12. Furthermore, in this way, the pressure lowered in relation to the ambient pressure, for example of lower than 100 mbar, can act on the melt surface of the melt bath during the mixing thereof.

Furthermore, it is also illustrated here that the mixing element 12 is connected in terms of drive to a dedicated, independent first drive device 18. In this way, it is made possible for the one or more mixing elements 12 to be operated with a dedicated rotational speed which may be selected independently of other drive elements. Thus, the mixing of the plastics melt, in particular the intensity of the mixing, can be freely selected in accordance with the intrinsic viscosity that is to be set and/or increased. In this way, the plastics melt in the second chamber part 9 of the second reactor housing part 5 can be moved and mixed constantly by the mixing element 12.

In the present exemplary embodiment, a discharge device 19 for the plastics melt is arranged so as to adjoin the outlet opening 11 arranged in the second reactor housing part 5. Said discharge device 19 may for example be a melt pump, an extruder or the like. To be able to set an independent extraction quantity or an independent extraction weight of the plastics melt from the second reactor housing 5, it is also provided here that the discharge device 19 is connected in terms of drive to a second drive device 20. Here, the second drive device 20 can be driven independently of the first drive device 18 of the mixing element 12. By means of this decoupling of the two drive devices 18, 20, it is possible to achieve more individual setting and adaptation of the intrinsic viscosity of the plastics melt to be treated.

The at least one outlet opening 11 for the plastics melt is in this case arranged in the region of the second end region 16 of the second reactor housing part 5, which second end region is arranged at a distance from the first reactor housing part 4, and in a base region of said second reactor housing part.

To quickly obtain a result of the treatment result performed in the reactor 2, it is advantageous if, by means of a measurement device, a measurement value of the intrinsic viscosity of the treated plastics melt is determined in the region of the outlet opening 11 or in a discharge section, directly adjoining said region, of the plastics melt. In this way, an in-line measurement can be performed directly adjacent to the reactor 2, and thus the treatment and method parameters can be readjusted or set, in order to achieve the predefined value of the intrinsic viscosity, without giving rise to a high level of waste material.

As already described above, in the second reactor housing part 5, there is provided at least one outlet opening 11, which in the present exemplary embodiment is arranged in a lower circumferential region of the base region of the second reactor housing part 5.

Furthermore, it is also illustrated in simplified form in FIG. 1 that the reactor 2 may be supported on a standing surface, for example on a level hall floor or the like, with the interposition of at least one weight-determining device 21. In this way, it is possible to determine the weight of the reactor 2 both in its empty state and in the operating state with the plastics melt to be treated accommodated therein.

The installation 1 preferably comprises at least one support frame 22, wherein at least the reactor 2, in particular the reactor housing 3 thereof, is held on the at least one support frame 22. In this way, as a further consequence, it is then possible for the at least one support frame 22 together with the reactor 2 held thereon to be supported on the standing surface via several of the weight-determining devices 21. It is furthermore also illustrated here that the at least one weight-determining device 21 may be arranged close to the ground in relation to the standing surface, between said standing surface and the support frame 22. It would however additionally also be possible for the at least one weight-determining device 21 to be, at its side averted from the reactor 2 or from the support frame 22 and facing toward the standing surface, supported on a base frame 23.

The base frame 23 may furthermore also be supported on the standing surface via wheels 24. In this way, it is made possible for the reactor 2 to be relocated in accordance with the selection and design of the wheels 24.

Independently thereof, it would however also be possible for at least the reactor 2, in particular the reactor housing 3 thereof, to be held on the support frame 22, in a suspended position on the support frame, via the at least one weight-determining device 21, as is illustrated in more detail in FIG. 3. Here, it is pointed out that this design of the support may in itself possibly constitute an independent embodiment.

The at least one weight-determining device 21 may for example be formed by a weighing cell or the like. If the reactor 2, in particular the reactor housing 3 thereof, is held on the support frame 22 in a suspended position on the support frame 22, the weight-determining device 21 may for example be formed by a set of tension scales or the like. Furthermore, the at least one weight-determining device 21 may have a communication connection to a control device. In this way, it is made possible for the measurement values determined by the one or more weight-determining devices 21 to be processed in the control device and, in a further process, for the method parameters required for the treatment to be generated and transmitted to the installation 1 with the installation components thereof.

It is however furthermore also possible for the discharge device 19 to likewise be supported on the standing surface with the interposition of at least one weight-determining device 21. The support may be realized by direct support or else in a suspended arrangement, as already described above for the reactor 2 in FIG. 3.

An installation 1 of said type may be operated such that the plastics melt to be treated is formed or produced in a preparation device which is not illustrated in any more detail and which is positioned upstream of the reactor 2. If the plastics melt is formed from recycled materials, these should preferably be separated by type in order to prevent contamination.

The plastics melt is to be treated is fed to the reactor 2 via the at least one feed line 10 which opens into the upper end region 6 of the first reactor housing part 4. The plastics melt subsequently passes through the first chamber part 8 which is enclosed by the first reactor housing part 4 and which itself has a vertical height extent. The plastics melt is subsequently collected in the second chamber part 9, which adjoins the lower end region 7 of the first reactor housing part 4 and which is enclosed by the second reactor housing part 5. Here, the collected plastics melt forms, in the second chamber part 9, a melt bath with a melt surface. In the case of a predefined setpoint fill level of the plastics melt, the melt surface of the plastics melt in the second chamber part 9 of the second reactor housing part 5 may for example lie approximately in the middle of the height of the second chamber part 9. Said height, or the level, may correspond approximately to the position of the axis of rotation 13. For the further treatment, the melt bath in the second reactor housing part 5 is moved and mixed by the mixing element 12. Said mixing process may preferably be performed continuously, possibly also with mutually different intensity. Following this treatment process of the plastics melt, the treated plastics melt is extracted or discharged from the second chamber part 9 through at least the outlet opening 11 arranged in the second reactor housing part 5.

As already described above, in a manner dependent on the predefined or preset setpoint fill level, the plastics melt in the second chamber part 9 forms the associated melt surface. Depending on the height of the melt surface in the second chamber part 9, the extraction of the treated plastics melt from the second chamber part 9 may be performed below the melt surface at an angle of 30°, preferably of 90°, with respect to a longitudinal axis of the second reactor housing part. In this way, the melt surface can have a longitudinal extent approximately equal to that of the mixing element, whereby, in this way, the reduced pressure can act on the melt surface of the melt bath during the mixing thereof. For this purpose, in a manner dependent on the geometrical design of the second reactor housing part 5, the at least one outlet opening 11 should be arranged at an angle of 30°, preferably of 90°, below a horizontal plane running through the longitudinal axis of the second reactor housing part 5.

The weight-determining devices 21 described above can be used in order to be able to keep the mass or weight balance of the plastics melt to be treated that is fed to the reactor 2 within predefined limits with respect to the mass or the weight of the extraction of the treated plastics melt. It is for example possible, before the commissioning of the installation 1, for a first measurement value of the inherent weight of the reactor 2 without the plastics melt to be determined by means of the at least one weight-determining device 21. Said measurement value may be transmitted to a control device and possibly stored therein. Subsequently, the plastics melt to be treated is fed to the reactor 2, wherein, when a setpoint fill level of the plastics melt in the second reactor housing part 5, and the associated level of the melt surface in the second chamber part 9, is reached, a second measurement value is determined by the at least one weight-determining device 21. Here, it is also possible again for said determined, second measurement value to be transmitted to and possibly stored in the control device. Here, the first determined measurement value corresponds to a net weight of the reactor 2. Then, a differential value formed from the second measurement value minus the first measurement value can be determined by the control device. Then, by means of the control device, in a manner dependent on the weight of treated plastics melt extracted from the second reactor housing part 5, the weight of fed plastics melt to be treated can, within predefined limits, be kept in equilibrium with respect to the previously determined differential value. Possible deviations of the equilibrium from the predefined limits may for example amount to +/−50%, preferably +/−30%, particularly preferably +/−15%.

FIG. 4 shows a further embodiment, which is possibly independent in itself, of the reactor 2 for forming the installation 1, wherein, in turn, for identical parts, the same reference designations or component names as in the preceding FIG. 3 are used. To avoid unnecessary repetitions, reference is made to the detailed description in the preceding FIG. 3. Here, it is pointed out that this embodiment constitutes a variant of the embodiments described above, and it is merely the case that some components have been multiplicated.

Here, the reactor housing 3 comprises in each case two first reactor housing parts 4 and two second reactor housing parts 5. The two approximately horizontally arranged reactor housing parts 5 are, at their second end regions 16, arranged so as to face toward one another and may be connected to one another there to form a unit. The respective first and second associated reactor housing parts 4 and 5 belonging together are arranged mirror-symmetrically about the two second end regions 16. It is preferable for a central, preferably common, outlet opening 11 to be provided at the second end regions 16 facing toward one another.

It would however also be possible for the two second reactor housing parts 5 to be formed from a single continuous structural element. It would however furthermore also be conceivable for the second reactor housing parts 5 to be assembled from multiple individual components.

It is also in turn the case that the at least one mixing element 12 is arranged within the two second chamber parts 9. To realize a targeted conveying movement for the plastics melt, the mixing elements 12 may be provided with gradients oriented oppositely to one another in the direction of the preferably common outlet opening 11. The melt that is situated in the second reactor housing parts 5 during operation is indicated by short dashes, wherein, below the two second reactor housing parts 5, the conveying movements of said melt directed toward one another are indicated by arrows. It is also conceivable here for an independent mixing element 12 to be provided in each of the second reactor housing parts 5. In this case, it would be possible for a central bearing point to be provided between the two mixing elements 12, wherein then, each of the mixing elements 12 must be driven by means of a dedicated first drive device 18, as is indicated by dashed lines in the right-hand part of the reactor 2.

It would however also be possible for the two mixing elements 12 to be connected to form one coherent component, or even to be formed in one piece. In this embodiment, it is then possible to make do with a single first drive device 18.

Likewise, it is also the case here that at least one discharge device 19 is provided in the region of the at least one outlet opening 11. Preferably, a central arrangement of only one outlet opening 11 is selected, in order that the melt is thus conveyed to a downstream device (not illustrated in any more detail) by means of only one discharge device 19. The chamber parts 8, 9 may likewise be evacuated, via suction-extraction lines 14, to a pressure lowered in relation to ambient pressure.

The entire reactor 2 may in turn be supported on the standing surface via the above-described weight-determining devices 21, possibly with the interposition of the support frame 22. The one or more weight-determining devices 21 may be supported, on the side averted from the reactor 2, on a base frame 23. The base frame 23 may then in turn be supported on the standing surface via multiple wheels 24.

The exemplary embodiments show possible design variants of the installation 1, in particular of the reactor 2 thereof, wherein it is pointed out at this juncture that the invention is not restricted to the specifically illustrated design variants thereof, but rather various combinations of the individual design variants with one another are also possible, and, on the basis of the teaching of the present invention relating to technical procedures, said possible variants lie within the capabilities of a person skilled in the art working in this technical field.

Furthermore, individual features or combinations of features from the various exemplary embodiments presented and described may also constitute independent inventive solutions or solutions according to the invention.

The problem addressed by the independent inventive solutions emerges from the description.

All specified value ranges in the present description are to be understood as encompassing any and all sub-ranges thereof; for example, the specification 1 to 10 is to be understood as encompassing all sub-ranges from the lower boundary of 1 to the upper boundary of 10, that is to say all sub-ranges begin with a lower boundary of 1 or higher and end with an upper boundary of 10 or lower, for example 1 to 1.7, or 3.2 to 8.1, or 5.5 to 10.

In particular, the individual embodiments shown in FIGS. 1, 2, 3 and 4 may form the subject matter of independent solutions according to the invention. The respectively applicable problems and solutions according to the invention emerge from the detailed descriptions of said figures.

For the sake of good order, it is finally pointed out that, for improved understanding of the construction of the installation 1, the latter or the constituent parts thereof have in part been illustrated not to scale and/or on an enlarged scale and/or on a smaller scale.

LIST OF REFERENCE DESIGNATIONS

1 Installation
2 Reactor
3 Reactor housing
4 First reactor housing part
5 Second reactor housing part
6 Upper end region
7 Lower end region
8 First chamber part
9 Second chamber part
10 Feed line
11 Outlet opening
12 Mixing element
13 Axis of rotation
14 Suction-extraction line
15 First end region
16 Second end region 17 Inner wall
18 First drive device
19 Discharge device
20 Second drive device
21 Weight-determining device
22 Support frame
23 Base frame
24 Wheel

The invention claimed is:

1. An installation (1) for treating a plastics melt, and setting the intrinsic viscosity thereof, having a reactor (2) which has a reactor housing (3) with at least one first reactor housing part (4) with an upper end region (6) and a lower end region (7) and which has a chamber part (8) extending between the upper and lower end regions (6, 7), wherein the first chamber part (8) has a vertical height extent, and the reactor housing (3) has, in the region of the lower end region (7) of the at least first reactor housing part (4), an at least second reactor housing part (5) which directly adjoins said first reactor housing part and which has a second chamber part (9), wherein the two chamber parts (8, 9) are connected to one another in terms of flow and are formed so as to be sealed off with respect to the external surroundings, and in the region of the upper end region (6) of the first reactor housing part (4), at at least one inlet opening, at least one feed line (10) for the plastics melt opens into the first reactor housing part (4), and at least one outlet opening (11) for the plastics melt is arranged in the second reactor housing part (5), and having at least one mixing element (12) which is arranged in the second reactor housing part (5), which mixing element (12) is mounted in the second reactor housing part (5) so as to be rotatable about an axis of rotation (13), and wherein the mixing element (12) is connected in terms of drive to a dedicated, independent first drive device (18),
   wherein the reactor (2) is supported on a standing surface with the interposition of at least one weight-determining device (21),
   wherein a discharge device (19) for the plastics melt is arranged so as to adjoin the outlet opening (11) of the second reactor housing part (5), which discharge device is in the form of a melt pump or in the form of an extruder,
   wherein the discharge device (19) is also supported on the standing surface with the interposition of at least one weight-determining device (21), and
   wherein the discharge device (19) is connected in terms of drive to a second drive device (20), wherein the second drive device (20) is driven independently of the first drive device (18) of the mixing element (12).

2. The installation (1) as claimed in claim 1, wherein said installation furthermore comprises at least one support frame (22), and at least the reactor (2) is held on the at least one support frame (22).

3. The installation (1) as claimed in claim 2, wherein the support frame (22) together with the reactor (2) held thereon is supported on the standing surface via several of the weight-determining devices (21).

4. The installation (1) as claimed in claim 1, wherein the at least one weight-determining device (21) is arranged close to the ground in relation to the standing surface.

5. The installation (1) as claimed in claim 1, wherein the at least one weight-determining device (21) is, at its side averted from the reactor (2) or from the support frame (22) and facing toward the standing surface, supported on a base frame (23), and the base frame (23) is supported on the standing surface via wheels (24).

6. The installation (1) as claimed in claim 1, wherein at least the reactor (2) is held on the support frame (22), in a suspended position on the support frame (22), via the at least one weight-determining device (21).

7. The installation (1) as claimed in claim 1, wherein the at least one weight-determining device (21) is formed by a weighing cell or a set of tension scales, wherein the at least one weight-determining device (21) has a communication connection to a control device.

8. The installation (1) as claimed in claim 1, wherein at least one of the first reactor housing part (4) and the second reactor housing part (5) is of tubular form.

9. The installation (1) as claimed in claim 1, wherein the second reactor housing part (5) has a longitudinal extent which is oriented so as to run approximately horizontally and which has first and second end regions (15, 16) at a distance from one another.

10. The installation (1) as claimed in claim 1, wherein the axis of rotation (13) of the mixing element (12) is arranged coaxially with respect to the second reactor housing part (5) of tubular form.

11. The installation (1) as claimed in claim 8, wherein the mixing element (12) is arranged with a minimum spacing of less than 1.0 mm to an inner wall (17) of the second reactor housing part (5).

12. The installation (1) as claimed in claim 8, wherein the mixing element (12) is arranged with a minimum spacing of greater than 1.0 mm to the inner wall (17) of the second reactor housing part.

13. The installation (1) as claimed in claim 1, wherein the mixing element (12) extends over the longitudinal extent of the second chamber part (9) between the first and second end regions (15, 16), which are arranged at a distance from one another, of the second reactor housing part (5) and is arranged entirely in the second chamber part (9).

14. The installation (1) as claimed in claim 1, wherein the two chamber parts (8, 9), which are connected to one another in terms of flow, of the two reactor housing parts (4, 5) are connected in terms of flow to a negative-pressure generator via at least one port opening and at least one suction-extraction line (14).

15. The installation (1) as claimed in claim 14, wherein the at least one suction-extraction line (14) is equipped, at least in regions, with a heating element.

16. The installation (1) as claimed in claim 1, wherein the at least one outlet opening (11) for the plastics melt is arranged in the region of the second end region (16) of the second reactor housing part (5) and in a base region of the latter, said second end region being arranged at a distance from the first reactor housing part (4).

17. A method for treating a plastics melt, and setting the intrinsic viscosity thereof, in which method the plastics melt to be treated is fed to a reactor (2) which has a reactor housing (3), comprising at least one first and at least one second reactor housing part (5), via at least one feed line (10) which opens into an upper end region (6) of the first reactor housing part (4), the plastics melt subsequently passes through a first chamber part (8) which is enclosed by the first reactor housing part (4) and which has a vertical height extent, the plastics melt is collected in a second chamber part (9) which adjoins a lower end region (7) of the first reactor housing part (4) and which is enclosed by the second reactor housing part (5), and in the process a melt bath with a melt surface is formed by the collected plastics melt in the second chamber part (9), the melt bath is moved and mixed in the second reactor housing part (5) by a mixing element (12), wherein the mixing element (12) is driven by a dedicated, independent first drive device (18), and wherein the treated plastics melt is extracted from the second chamber part (9) through at least one outlet opening (11) arranged in the second reactor housing part (5), wherein, firstly, a first measurement value of the weight of the reactor (2) itself together with a discharge device (19), which is arranged so as to adjoin the outlet opening (11) arranged in the second reactor housing part (5) and which is in the form of a melt pump or in the form of an extruder, and without the plastics melt is determined by at least one weight-determining device (21) and transmitted to a control device and is possibly stored in the latter, wherein the plastics melt to be treated is subsequently fed to the reactor (2) and, when a setpoint fill level of the plastics melt, and the associated level of the melt surface, in the second chamber part (9) of the second reactor housing part (5) is reached, a second measurement value is determined by the at least one weight-determining device (21) and transmitted to the control device and is possibly stored in the latter, wherein, then a differential value is determined from the second measurement value minus the first measurement value by the control device, wherein in a manner dependent on the weight of treated plastics melt extracted from the second reactor housing part (5), the weight of fed plastics melt to be treated is, within predefined limits, kept in equilibrium with respect to the previously determined differential value by the control device, wherein the discharge device (19) which is arranged so as to adjoin the outlet opening (11) arranged in the second reactor housing part (5) is driven by a second drive device (20), and wherein the second drive device (20) is driven independently of the first drive device (18) of the mixing element (12).

18. The method as claimed in claim 17, wherein the plastics melt to be treated which is fed to the reactor (2) is split up into a multiplicity of thin melt filaments in the first reactor housing part (4), and the thin melt filaments pass in a free-falling manner through the first chamber part (8).

19. The method as claimed in claim 17, wherein the plastics melt in the second chamber part (9) of the second reactor housing part (5) is moved and mixed constantly by the mixing element (12).

20. The method as claimed in claim 17, wherein the chamber parts (8, 9) enclosed by the two reactor housing parts (4, 5) are evacuated to a pressure of lower than 100 mbar.

21. The method as claimed in claim 20, wherein the melt surface of the melt bath in the second chamber part (9) is formed with a length extent approximately equal to that of the mixing element (12), and thus the pressure of lower than 100 mbar acts on the melt surface of the melt bath during the mixing thereof.

22. The method as claimed in claim 17, wherein the melt surface of the plastics melt is, in the case of the predefined setpoint fill level in the second chamber part (9) of the second reactor housing part (5), situated approximately in the middle of the height of the second chamber part (9).

23. The method as claimed in claim 17, wherein the extraction of the treated plastics melt from the second chamber part (9) is performed below the melt surface at an angle of at least 30° with respect to a longitudinal axis of the second reactor housing part (5).

24. The method as claimed in claim 17, wherein a measurement value of the intrinsic viscosity of the treated plastics melt is determined in the region of the outlet opening (11) or in a discharge section, directly adjoining said region, of the plastics melt by a measurement device.

25. An installation (1) for treating a plastics melt, and setting the intrinsic viscosity thereof, having a reactor (2) which has a reactor housing (3) with at least one first reactor housing part (4) with an upper end region (6) and a lower end region (7) and which has a chamber part (8) extending between the upper and lower end regions (6), wherein the first chamber part (8) has a vertical height extent, and the reactor housing (3) has, in the region of the lower end region (7) of the at least one first reactor housing part (4), an at least second reactor housing part (5) which directly adjoins said first reactor housing part and which has a second chamber part (9), wherein the at least one second reactor housing part (5) has a longitudinal extent which is oriented so as to run approximately horizontally and which has a first end region (15) and a second end region (15) arranged at a distance from said first region, and the chamber parts (8, 9) are connected to one another in terms of flow and are formed so as to be sealed off with respect to the external surroundings, and in the region of the upper end region (6) of the at least one first reactor housing part (4), at at least one inlet opening, at least one feed line (10) for the plastics melt opens into the at least one first reactor housing part (4), and at least one outlet opening (11) for the plastics melt is arranged in the at least one second reactor housing part (5), and wherein the at least one outlet opening (11) for the plastics melt is arranged in the region of the second end region (16) of the at least one second reactor housing part (5), which second end region is arranged at a distance from the at least one first reactor housing part (4), and the chamber parts (8, 9), which are connected to one another in terms of flow, of the first and second reactor housing parts (4, 5) are connected in terms of flow to a negative-pressure generator via at least one port opening and at least one suction-extraction line (14), and having at least one mixing element (12) which is arranged in the at least one second reactor housing part (5), which mixing element (12) is mounted in the at least one second reactor housing part (5) so as to be rotatable about an axis of rotation (13), wherein the reactor housing (3) comprises two first reactor housing parts (4) and two second reactor housing parts (5), wherein the two horizontally arranged second reactor housing parts (5) are, at their second end regions (16), arranged so as to face toward one another and are connected to one another at the second end regions (16) to form a unit, wherein the at least one outlet opening (11) is arranged in a base region of the second reactor housing parts (5), and wherein the at least one mixing element (12) extends in each case over the longitudinal extent of the second chamber parts (9) between the first and second end regions (15, 16), which are arranged at a distance from one another, of the second reactor housing parts (5) and is arranged entirely in each of the second chamber parts (9).

26. The installation (1) as claimed in claim 25, wherein the first reactor housing parts (4) and/or the second reactor housing parts (5) are of tubular form.

27. The installation (1) as claimed in claim 26, wherein the axis of rotation (13) of the mixing element (12) is arranged coaxially with respect to the second reactor housing part (5) of tubular form.

28. The installation (1) as claimed in claim 26, wherein the mixing element (12) is arranged with a minimum spacing of less than 1.0 mm to an inner wall (17) of the second reactor housing part (5).

29. The installation (1) as claimed in claim 26, wherein the mixing element (12) is arranged with a minimum spacing of greater than 1.0 mm to the inner wall (17) of the second reactor housing part.

30. The installation (1) as claimed in claim 25, wherein an independent mixing element (12) is provided in each of the second reactor housing parts (5), and each of the mixing elements (12) is connected in terms of drive to a dedicated, independent first drive device (18).

31. The installation (1) as claimed in claim 25, wherein the mixing elements (12) arranged in the two second reactor housing parts (5) are connected to one another to form one coherent component, and the mixing elements (12) have oppositely oriented gradients.

32. The installation (1) as claimed in claim 25, wherein the at least one outlet opening (11) in the second reactor housing part (5) is arranged at an angle of at least 30° below a horizontal plane running through a longitudinal axis of the second reactor housing part (5).

33. The installation (1) as claimed in claim 25, wherein a discharge device (19) for the plastics melt is arranged so as to adjoin the at least one outlet opening (11) in the second reactor housing part (5).

34. The installation (1) as claimed in claim 33, wherein the discharge device (19) is connected in terms of drive to a second drive device (20), wherein the second drive device (20) is driven independently of the one or more first drive devices (18) of the one or more mixing elements (12).

35. The installation (1) as claimed in claim 25, wherein the reactor (2) is supported on a standing surface with the interposition of at least one weight-determining device (21).

36. The installation (1) as claimed in claim 35, wherein said installation furthermore comprises a support frame (22), and at least the reactor (2) is held on the support frame (22).

37. The installation (1) as claimed in claim 36, wherein the support frame (22) together with the reactor (2) held thereon is supported on the standing surface via several of the weight-determining devices (21).

38. The installation (1) as claimed in claim 35, wherein the at least one weight-determining device (21) is arranged close to the ground in relation to the standing surface.

39. The installation (1) as claimed in claim 35, wherein the at least one weight-determining device (21) is, at its side averted from the reactor (2) or from the support frame (22) and facing toward the standing surface, supported on a base frame (23), and the base frame (23) is supported on the standing surface via wheels (24).

40. The installation (1) as claimed in claim 35, wherein at least the reactor (2) is held on the support frame (22), in a suspended position on the support frame (22), via the at least one weight-determining device (21).

41. The installation (1) as claimed in claim 35, wherein the at least one weight-determining device (21) is formed by a weighing cell or a set of tension scales, wherein the at least one weight-determining device (21) has a communication connection to a control device.

42. The installation (1) as claimed in claim 33, wherein the discharge device (19) is also supported on the standing surface with the interposition of at least one weight-determining device (21).

43. A method for treating a plastics melt, and setting the intrinsic viscosity thereof, in which method the plastics melt to be treated is fed to a reactor (2) which has a reactor housing (3), comprising at least one first and at least one second reactor housing part (4), via at least one feed line (10) which opens into an upper end region (6) of the at least one first reactor housing part (4), the plastics melt subsequently passes through a first chamber part (8) which is enclosed by the at least one first reactor housing part (4) and which has a vertical height extent, the plastics melt is collected in a second chamber part (9) which adjoins a lower end region (7) of the at least one first reactor housing part (4) and which is enclosed by the at least one second reactor housing part (5), and in the process a melt bath with a melt surface is formed by the collected plastics melt in the at least one second chamber part (9), wherein the second chamber part (9) has a longitudinal extent which is oriented so as to run approximately horizontally and which has a first end region (15) and a second end region (15) arranged at a distance from said first end region, and the two chamber parts (8, 9) are connected to one another in terms of flow and are sealed off with respect to the external surroundings and are evacuated to a pressure of lower than 100 mbar by a negative-pressure generator, the melt bath is moved and mixed in the at least one second reactor housing part (5) by a mixing element (12) which is mounted so as to be rotatable about an axis of rotation (13), and the treated plastics melt is extracted from the second chamber part (9) through at least one outlet opening (11) arranged in the region of the second end region (16) of the at least one second reactor housing part (5), which second end region is arranged at a distance from the first reactor housing part (4), wherein the reactor housing (3) is formed from two first reactor housing parts (5) and two second reactor housing parts (5), wherein the two horizontally arranged second reactor housing parts (5) are, at their second end regions (16), arranged so as to face toward one another and are connected to one another at the second end regions (16) to form a unit, and —wherein the extraction of the treated plastics melt from the second chamber parts (9) of the two second reactor housing parts (5) is performed below the melt surface at an angle of at least 30° with respect to a longitudinal axis of the second reactor housing parts (5), such that the melt surface has a length extent approximately equal to that of the mixing elements (12), and thus the reduced pressure acts on the melt surface of the melt bath during the mixing of the melt bath.

44. The method as claimed in claim 43, wherein an independent mixing element (12) is provided in each of the second reactor housing parts (5), and each of the mixing elements (12) is driven by a dedicated, independent first drive device (18).

45. The method as claimed in claim 43, wherein the mixing elements (12) arranged in the two second reactor housing parts (5) are connected to one another to form one coherent component, and the mixing elements (12) are formed with oppositely oriented gradients.

46. The method as claimed in claim 43, wherein the plastics melt in each of the second chamber parts (9) of the second reactor housing parts (5) is moved and mixed constantly by the mixing element (12).

47. The method as claimed in claim 43, wherein a discharge device (19) which is arranged so as to adjoin the outlet opening (11) arranged in the second reactor housing part (5) is driven by a second drive device (20), wherein the second drive device (20) is driven independently of the one or more first drive devices (18) of the one or more mixing elements (12).

48. The method as claimed in claim 43, wherein firstly, a first measurement value of the weight of the reactor (2) itself without the plastics melt is determined by at least one weight-determining device (21) and transmitted to a control device and is possibly stored in the latter, the plastics melt to be treated is subsequently fed to the reactor (2) and, when a predefined fill level of the plastics melt, and the associated level of the melt surface, in the second chamber parts (9) of the second reactor housing parts (5) is reached, a second measurement value is determined by the at least one weight-determining device (21) and transmitted to the control device and is possibly stored in the latter, and then a differential value is determined from the second measurement value minus the first measurement value by the control device, and wherein in a manner dependent on the weight of treated plastics melt extracted from the second reactor housing parts (5), the weight of fed plastics melt to be treated is, within predefined limits, kept in equilibrium with respect to the previously determined differential value by the control device.

49. The method as claimed in claim 48, wherein the discharge device (19) is also supported on the standing surface with the interposition of at least one weight-determining device (21).

50. The method as claimed in claim 43, wherein a measurement value of the intrinsic viscosity of the treated plastics melt is determined by a measurement device in the region of the outlet opening (11) or in a discharge section, directly adjoining said region, of the plastics melt.

51. The method as claimed in claim 43, wherein the melt surface of the plastics melt is, in the case of the predefined fill level in the second chamber parts (9) of the second reactor housing parts (5), situated approximately in the middle of the height of the second chamber parts (9).

\* \* \* \* \*